Aug. 6, 1940.  H. R. SMITH  2,210,506
SHOCK ABSORBING DRIVE FOR EARTH BORING APPARATUS
Filed June 24, 1939  3 Sheets-Sheet 1
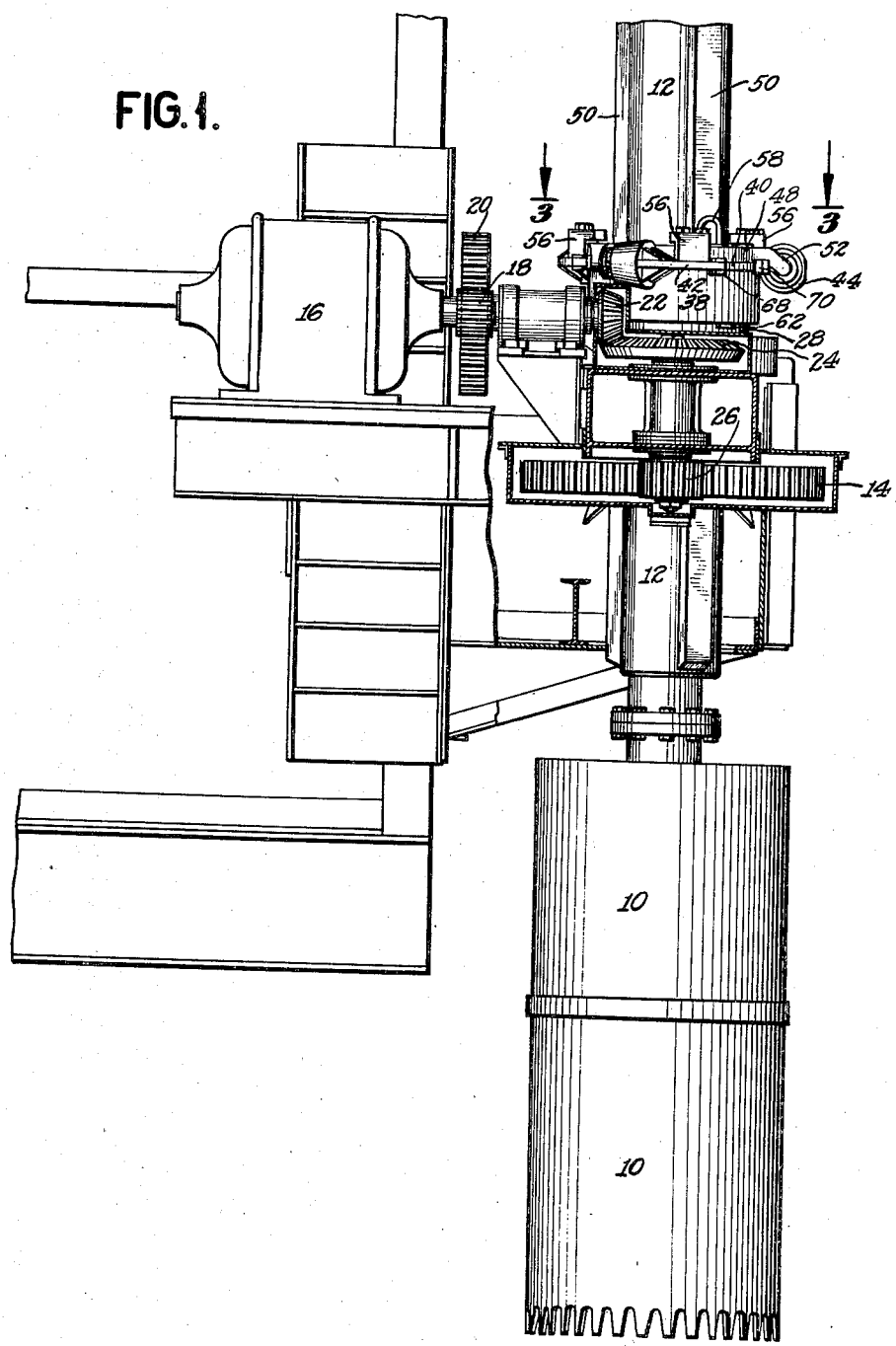
INVENTOR
*HERMAN R. SMITH*
BY
*Cooper, Kerr & Dunham*
ATTORNEYS

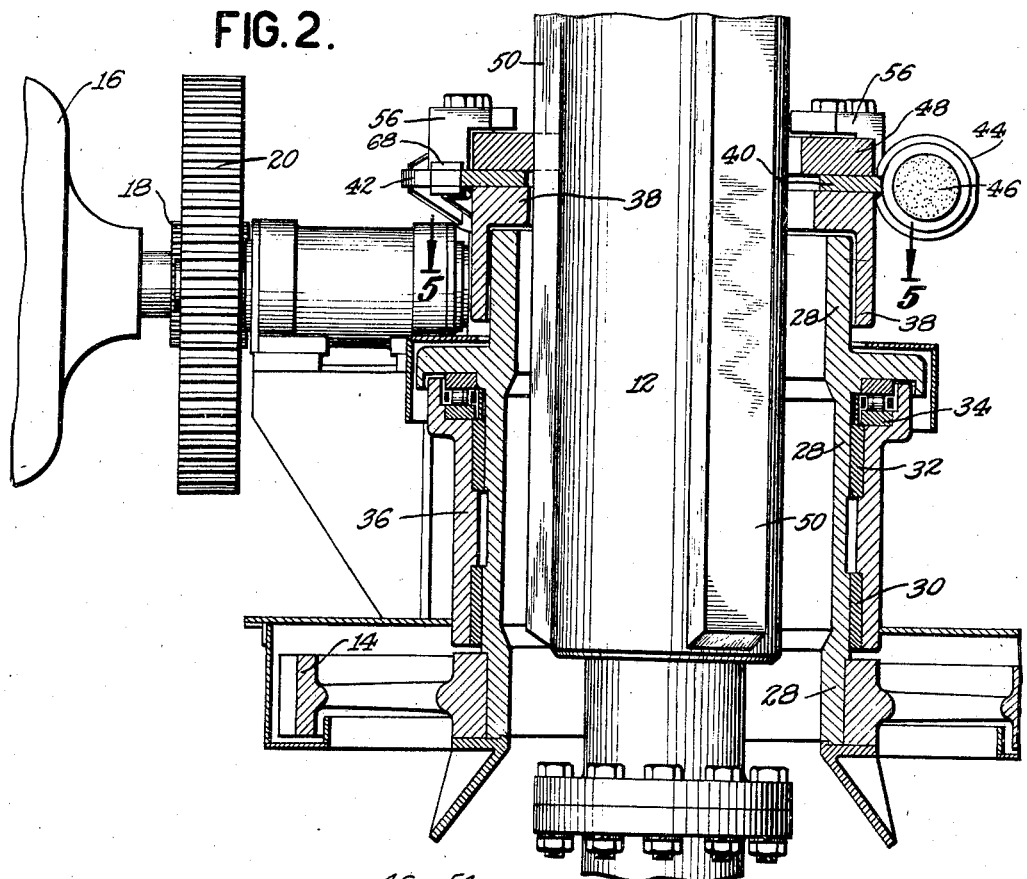
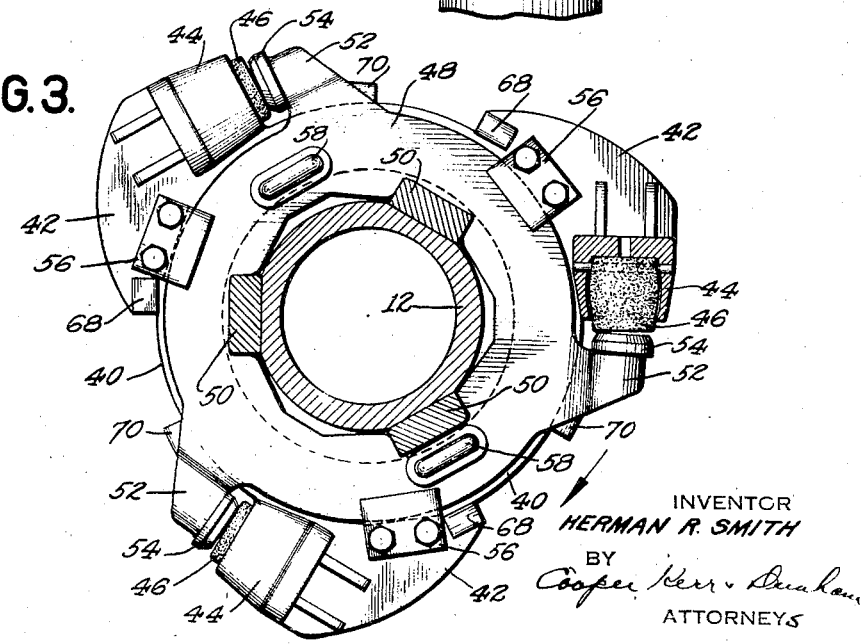

Aug. 6, 1940.  H. R. SMITH  2,210,506
SHOCK ABSORBING DRIVE FOR EARTH BORING APPARATUS
Filed June 24, 1939   3 Sheets-Sheet 3
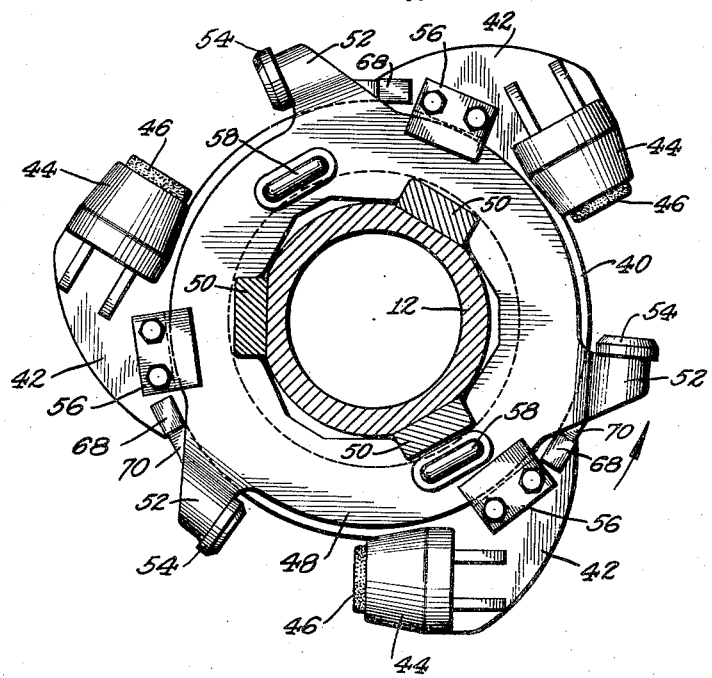
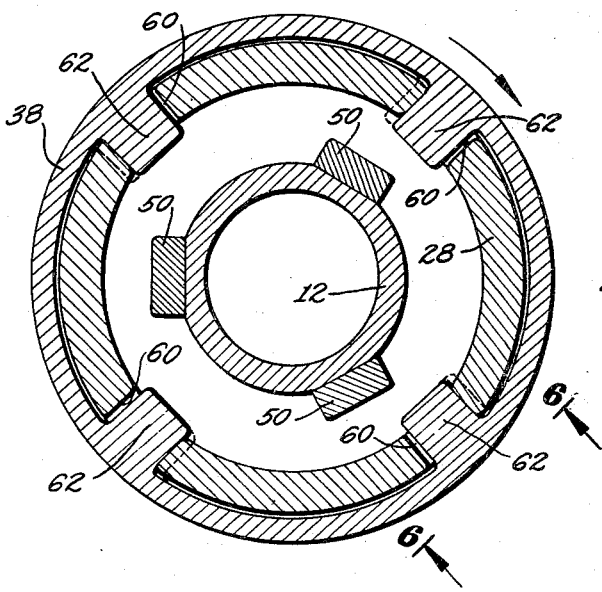
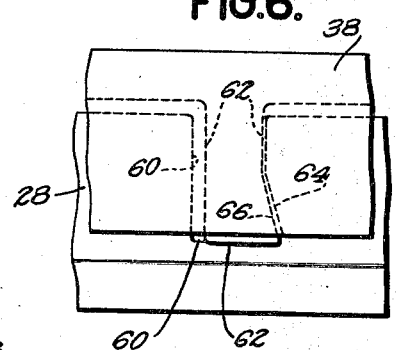
INVENTOR
*HERMAN R. SMITH*
BY
*Cooper, Kerr & Dunham*
ATTORNEYS Patented Aug. 6, 1940

2,210,506

UNITED STATES PATENT OFFICE 2,210,506

SHOCK ABSORBING DRIVE FOR EARTH BORING APPARATUS

Herman R. Smith, Douglaston, N. Y., assignor to Raymond Concrete Pile Company, New York, N. Y., a corporation of New Jersey Application June 24, 1939, Serial No. 281,017

2 Claims. (Cl. 255—19)

This invention pertains to apparatus for boring into the earth, with particular reference to improved means for rotating a drill stem and bucket under very severe service conditions. For example, the presence of coarse sand, gravel and boulders in the ground often subjects the rotary equipment to very severe punishment. The resistance encountered momentarily stalls the bucket, with the result that the drill stem and shafting of the rotary equipment twist until the torque is sufficient to overcome the resistance, whereupon the bucket rotates suddenly for a small part of a revolution under the drive of the motor plus the spring effect of the wound-up drill stem and shafting. Then the stalling, winding-up and letting-go cycle repeats indefinitely and at times with machine gun rapidity until the vibration and pounding results in failure of some part of the apparatus.

An object of the invention is to prevent the above difficulties by providing driving mechanism including means for overcoming the above difficulties.

Further and other objects and advantages will be apparent from the specification and claims, and from the accompanying drawings which illustrate what is now considered a preferred embodiment of the invention.

Figure 1 is a general view of the complete apparatus.

Fig. 2 is an enlarged view of that portion of the apparatus which includes the resilient drive.

Fig. 3 is a view on line 3—3 of Fig. 1.

Fig. 4 is similar to Fig. 3, but with the parts in different relative positions.

Fig. 5 is a cross-section on line 5—5 of Fig. 2.

Fig. 6 is a view in the direction of 6—6 of Fig. 5.

Referring to Fig. 1, 10 represents a bucket or core barrel attached to, and rotated by, the hollow drill stem 12 which in turn is rotated by gear 14 in a manner to be described. Gear 14 is driven by one or more motors 16 through gearing such as spur pinion 18, gear 20, bevel pinion 22, bevel gear 24, and spur pinion 26 (Fig. 1).

Referring to Fig. 2, gear 14 is integral with the upwardly extending annular drill spindle 28 which is supported for rotation on bearings 30, 32 and 34 in a shell 36 integral with the framework of the machine.

Mounted on top of member 28 and driven thereby in a manner which will be described, is a ring 38. Welded to ring 38 is an annular plate 40 having three projecting portions 42 (Figs. 3 and 4) upon each of which is rigidly mounted a cup-shaped receptacle 44, axially horizontal and adapted to contain a resilient member, usually in the form of a substantially cylindrical rubber bumper 46, which normally projects slightly from the open end of cup 44.

Resting on plate 40 is another annular plate or collar designated 48, the inner circumference of which is provided with slots to slidably engage the three splines 50 extending lengthwise of drill stem 12 and integral therewith. The outer circumference of plate 48 has three radial projections 52, each provided with a pad 54 adapted to take the thrust of one of the resilient bumpers 46 (Fig. 3).

Bolted to each part 42 of plate 40 is a clip 56 adapted to keep plate 40 in contact, and concentric with, plate 48. Plate 48 is provided with a pair of lifting rings 58 (Figs. 1, 3 and 4).

The method of operatively connecting ring 38 and drive spindle 28 is not indicated in Fig. 2, but is illustrated in Figs. 5 and 6. The top of rotary spindle 28 is provided with four slots 60 (Figs. 5 and 6) each engaged by a lug 62 on the inside of ring 38. Slots 60 are undercut as indicated at 64 (Fig. 6), and lugs 62 are shaped as at 66 to engage the undercut thereby preventing the lugs from inadvertently rising from the slots. In operation, with the parts rotating in the direction indicated by the arrow in Fig. 3, the rubber cushions 46 compress more or less as the load varies, with the result that practically all of the noise and most of the vibration of the drilling rig is eliminated. The bumpers also serve to cushion the blow when the core barrel or excavating bucket encounters any sudden resistance severe enough to stall the motors which, under certain conditions, occurs at frequent intervals. When such a stall occurs it has been found that the flywheel effect of the motors stores up more energy than what is delivered by a pile driving hammer at the moment of impact; but it has been found in service that the present invention so greatly reduces the stresses on shafting and other parts of the apparatus, that breakage is practically eliminated.

Occasionally, the rotary table is driven in a reverse direction, and to meet that condition projections 42 on ring 40 are provided with stops 68 adapted for engagement by lugs 70 on projections 52 of ring 48 (Fig. 4). Since the service is very light in this reverse motion, no rubber cushions or bumpers are necessary.

It is to be understood that the invention is not limited to the specific embodiment herein illustrated and described, but may be used in other ways without departure from its spirit as defined by the following claims.

I claim:

1. In apparatus for boring into the ground, in combination, a vertical drill stem, a collar surrounding said stem and slidable therealong, means preventing rotation of said collar relatively to said stem, a ring supported for rotation about said stem adjacent said collar, means for rotating said ring, and a resilient device for transmitting power from said ring to said collar whereby rotation of said ring will resiliently rotate said stem through the instrumentality of said collar.

2. In apparatus for boring into the ground, in combination, a vertical drill stem, a collar surrounding said stem and slidable therealong, means preventing rotation of said collar relatively to said stem, a ring supported for rotation about said stem adjacent said collar, means for rotating said ring, and a plurality of rubber bumpers on said ring and adapted to engage said collar and rotate said stem through the instrumentality of said collar.

HERMAN R. SMITH.